(12) United States Patent
Niiyama et al.

(10) Patent No.: US 6,914,648 B2
(45) Date of Patent: Jul. 5, 2005

(54) ELECTRONIC SHELF LABEL

(75) Inventors: Satoshi Niiyama, Kanagawa (JP); Noriko Suehiro, Kanagawa (JP)

(73) Assignee: OPTREX Corporation, Tokyo (JP)

( * ) Notice: Subject to any disclaimer, the term of this patent is extended or adjusted under 35 U.S.C. 154(b) by 62 days.

(21) Appl. No.: 10/245,640

(22) Filed: Sep. 18, 2002

(65) Prior Publication Data

US 2003/0053014 A1 Mar. 20, 2003

(30) Foreign Application Priority Data

Sep. 19, 2001 (JP) .............................. 2001-285979
Sep. 21, 2001 (JP) .............................. 2001-290218

(51) Int. Cl.⁷ .............................................. G02F 1/1347
(52) U.S. Cl. ..................... 349/78; 106/169; 106/76; 106/74; 106/172
(58) Field of Search ................... 349/74, 76, 78, 349/172, 169, 73

(56) References Cited

U.S. PATENT DOCUMENTS 6,806,924 B2    10/2004   Niiyama et al.

*Primary Examiner*—Tarifur R. Chowdhury
*Assistant Examiner*—Richard Kim
(74) *Attorney, Agent, or Firm*—Oblon, Spivak, McClelland, Maier & Neustadt, P.C.

(57) ABSTRACT

There are provided at least two liquid crystal panels 10, 20 including the liquid crystals developing a memory effect, the liquid crystal developing a memory effect on a side opposite to a viewer side has a selective reflection wavelength set at 615–665 nm, the liquid crystal developing a memory effect on the viewer side has a selective reflection wavelength set at 490–540 nm, and a color filter having a certain transmission property is provided between the liquid crystal developing a memory effect on the viewer side and the liquid crystal developing a memory effect on the side opposite to the viewer side.

18 Claims, 4 Drawing Sheets

ELECTRONIC SHELF LABEL

The present invention relates to an electronic shelf label, which is electrically rewritable and is used in item retailers, such as supermarkets or convenience stores, more specifically, to a display technique capable of making an arbitrary selection of a displayed color of information on item including information on price or information on incidental matter.

In item retailers, such as supermarkets or convenience stores, respective items have been displayed with their own labels. Recently, an electronic shelf label (a price label display), which comprises a liquid crystal display element, has been used as a shelf label in cooperation with, e.g., a POS (point of sale) system to electrically rewrite item prices in proper fashion.

Since the liquid crystal display element for an electronic shelf label relies on a battery as a power source in many cases, a TN liquid crystal is utilized to provide display in segment fashion in terms of a limitation in the operating life of the battery and low cost.

In order to direct customers' attention to a discounted item on special sale for instance, a polarizer, which is partly colored such as red, is utilized to display a phrase, such as "Today's Special", in a part of the screen.

By the way, a conventionally typical price indication (POP) by use of a printed label has indicated a price in black on normal sale and in red on special sale. The display of a price in different colors is popular usage as an indication, which makes it easy for customers to understand.

However, when the color of a price indication is changed in an electronic shelf label, which uses a conventional color polarizer and makes display in TN segment fashion as a reflective type, the color of a price indication cannot be changed at the same position in principle without replacement to another polarizer.

From this viewpoint, it is an object of the present invention to provide an electronic shelf label using a liquid crystal display element capable of properly changing the displayed color of information on item including information on price or information on incidental matter without replacement to another polarizer, and of minimizing consumption of a battery.

In order to solve the object, the present invention is directed to an electronic shelf label, which is characterized in that it uses a liquid crystal display element comprising a chiral nematic liquid crystal sandwiched between a substrate on a viewer side and a substrate on a rear side, and a certain light absorbing layer provided on the substrate on the rear side to display information on an item, information on parts or information on material; the liquid crystal developing a memory effect and being controllably brought into at least two different optical states of a planar state and a focal conic state, depending on an applied voltage; the substrates having respective inner surfaces formed with transparent electrodes; and the light absorbing layer providing a background color.

In accordance with the present invention, it is possible to display the color of, e.g., a price indication in either one of the selective reflection color in the planar state or the background color in the focal conic state by controlling an applied voltage without replying on a polarizer even in the case of using a single liquid crystal element.

In accordance with the present invention, it is possible to display pieces of information including at least two pieces of information among information on item name, information on price, information on quantity, information on date, information on item number and information on part number in at least two colors selected from four colors of a combination of black, white, red and green or black, white, orange and blue by providing at least two liquid crystal display elements, the respective liquid crystal display elements including chiral nematic liquid crystals having different selective reflection colors in the planar state.

In the present invention, the information on item may be displayed by segment patterns of the transparent electrodes or displayed by dot-matrix patterns of the transparent electrodes. In particular, when the liquid crystal display element has a two-layered structure, and when the display is provided in dot-matrix fashion, many pieces of information can be effectively displayed.

In the case of POP, for example, indication of an item name in black on a blue background, and indication of the price and information on the producer in black on a white background can be displayed in a single screen as various sorts of piece of information have frequently been indicated in different colors in printed lables. More pieces of information can be displayed in a color different from the color on normal sale as needed, in such a way that a price column, which is displayed in black on normal sale, is displayed in red on special sale, for instance.

In any of the modes, it is enough to apply a certain voltage across the transparent electrodes only at the time of making a change in display since the chiral nematic liquid crystal develops a memory effect. It is possible to extend the operational life of a battery accordingly.

Now, embodiments of the present invention will be described. Display patterns can be roughly classified into two types of segment display shown in FIG. 1 and dot-matrix display shown in FIG. 4. First of all, an electronic shelf label in segment fashion will be described in reference to the schematic front view of FIG. 1 and the enlarged cross-sectional view of essential parts of FIG. 2.

The shown electronic shelf label comprises a chiral nematic liquid crystal display element (liquid crystal display element developing a memory effect). Specifically, the electronic shelf label includes a substrate 21 on a viewer side and a substrate 31 on a rear side, and the respective substrates have inner surfaces formed with transparent electrodes of ITO 22, 32. In the shown embodiment, the number of the digits indicating an item price is 4, and the respective digits are formed in a 7-segment pattern, wherein 7 segments are arranged in an 8-character shape.

Figure 1:
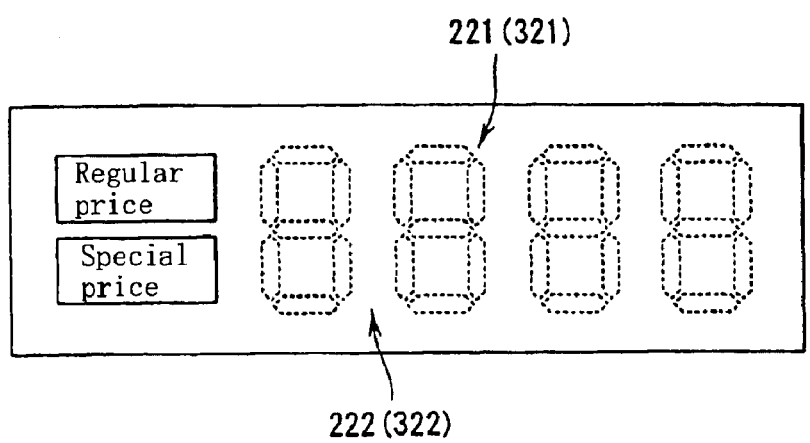
FIG. 1 is a schematic front view showing the electric shelf label of present invention provided with segment type of a display in an embodiment.
Figure 2:
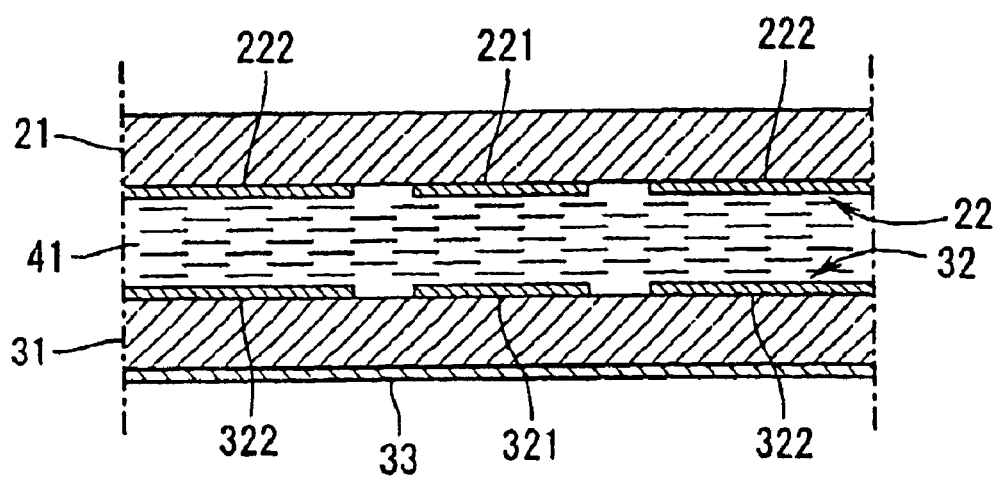
FIG. 2 is a schematic close-up cross-sectional view showing the substantial part of said electric shelf label.

As schematically shown in FIG. 2, the transparent electrodes 22, 32 include price indication electrodes 221, 321 having an 8-character pattern and background electrodes 222, 322. Although only "Regular Price", "Special Price" and 4 digits of "column of an item price" are shown in FIG. 1, another piece of information of the item, such as "Item Name" or "Producing Area" may, of course, be shown. The electronic shelf label may be used to make display, such as information on parts or information on material. An example of the information on parts is information on partly-finished products stored in a warehouse.

The substrate 21 on the viewer side and the substrate 31 on the rear side have a chiral nematic liquid crystal 41 sandwiched therebetween. The substrate 31 on the rear side has a light-absorbing layer developing a certain color 33 provided thereon. The electronic shelf label can display the price of an item in different colors on normal sale and special sale for instance.

EXAMPLE 1

As the chiral nematic liquid crystal 41 is used one that has a selective reflection color of "green" in the planar state, and the light-absorbing layer 33 on the rear side is black. The price of an item is displayed in green on a black background (in negative fashion) by selectively controlling the applied voltage across the chiral nematic liquid crystal 41 to bring portions of the liquid crystal between the price indication electrodes 221, 321 into the planar state and portions of the liquid crystal between the background electrodes 222, 322 into the focal conic state on normal sale.

On the other hand, the portions of the liquid crystal between the price indication electrodes 221, 321 are brought into the focal conic state and the portions of the liquid crystal between the background electrodes 222, 322 are brought into the planar state on special sale. Thus, the price of the item is displayed in black on a green background (in positive fashion).

Figure 3:
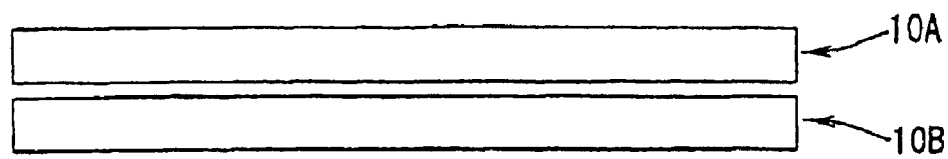
FIG. 3 is a simplified side view showing double-LC-layered electric shelf label of an embodiment of the present invention.

As shown in FIG. 3, two chiral nematic liquid crystal elements 10A, 10B can be used to put one on the other, providing at least four color illuminations.

EXAMPLE 2

As one of the electronic shelf labels 10A is used a chiral nematic liquid crystal having a selective reflection color of 620 nm (dominant wavelength), and as the other electronic shelf label 10B is used a chiral nematic liquid crystal having a selective reflection color of 490 nm (dominant wavelength). In this example, the electronic shelf label 10A is provided in an upper position, the electronic shelf label 10B is provided under the upper electronic shelf label, and the light-absorbing layer on the rear side (black in this example as well) is provided only on the lower electronic shelf label 10B.

1) The item price is displayed in black on a nearly white background by bringing the portions of the liquid crystal between the price indication electrodes 221, 321 into the focal conic state and the portions of the liquid crystal between the background electrodes 222, 322 into the planar state in both electronic shelf labels 10A, 10B.

2) The item price is displayed in orange on a nearly white background by bringing the portions of the liquid crystal between the price indication electrodes 221, 321 and between the background electrodes 222, 322 into the planar state in the upper electronic shelf label 10A, and bringing the portions of the liquid crystal between the price indication electrodes 221, 321 into the focal conic state and the portions of the liquid crystal between the background electrodes 222, 322 into the planar state in the lower electronic shelf label 10B.

3) The upper electronic shelf label 10A has the portions of the liquid crystal between the price indication electrodes 221, 321 brought into the planar state and the portions of the liquid crystal between the background electrodes 222, 322 into the focal conic state, and the lower electronic shelf label 10B has the portions of the liquid crystal between the price indication electrodes 221, 321 brought into the focal conic state and the portions of the liquid crystal between the background electrodes 222, 322 into the planar state. Thus, the item price is displayed in orange on a blue background.

As explained, the two chiral nematic liquid crystal display elements 10A, 10B having different selective reflection colors can be combined to provide at least four colors of white, black, orange and blue. The liquid crystal display elements offer the advantage of minimizing consumption of a battery since the chiral nematic liquid crystal can maintain the planar state and the focal conic state in stable fashion even when no voltage is applied.

Although only the color of the item price is changed in the examples, the displayed color of "Regular Price", "Special Price", "Item Name" or incidental information, such as "Producing Area" may also be changed.

Referring now to FIG. 4 through FIG. 7, explanation will be made about an electronic shelf label, which adopts at least two liquid crystals developing a memory effect in layer and provides multi-color display in dot-matrix fashion.

The examples stated below aimed at obtaining a chromatic color, such as red or blue, in addition to bright black and white display having high color purity. When red is displayed, illumination in red was obtained in combination with a certain color filter, which was associated with the selective reflection wavelength of a liquid crystal developing a memory effect, the selective reflection wavelength lying on a longer wavelength side. It was found that the brightness, the color purity and the hue of red could be almost determined by a set selective reflection wavelength on the longer wavelength side and the properties of a color filter. A combination of respective property values, at which black, white and red can be displayed in preferable fashion, is shown in Example 3 stated below, and a combination of respective property values, at which black and white can be displayed in more preferable fashion though red is not displayed, is shown in Example 4 stated below.

Figure 5:
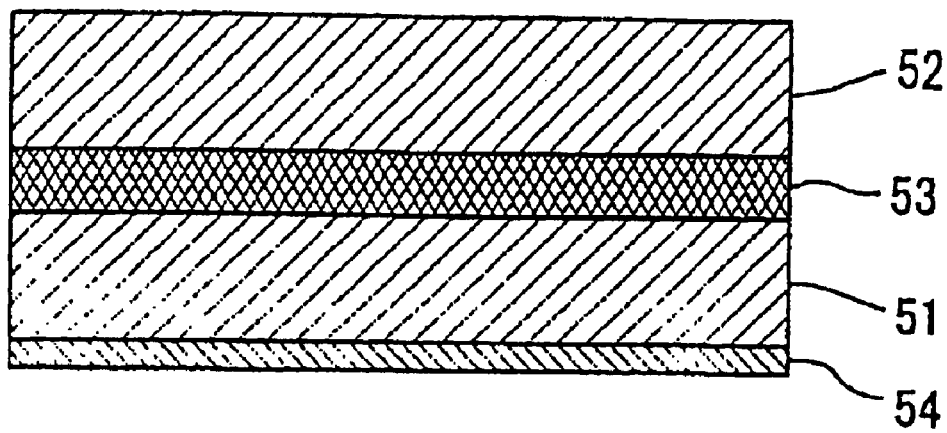
FIG. 5 is a schematic cross-sectional view showing a constitution of another double-LC-layered electric shelf label.

As shown in FIG. 5, a liquid crystal panel 51 having a selective reflection wavelength on a longer wavelength side, was provided on a no-viewer side (rear side), the liquid crystal panel and the other liquid crystal panel 52 having a selective reflection wavelength on a short wavelength side had a color filter 53 provided therebetween, and the selective reflection wavelength on the short wavelength side was set at a certain value, realizing black and white display close to an achromatic color, in addition to bright red display having high color purity. The liquid crystal panel 51 had a rear side provided with a black painting 54 to provide black display.

Figure 6:
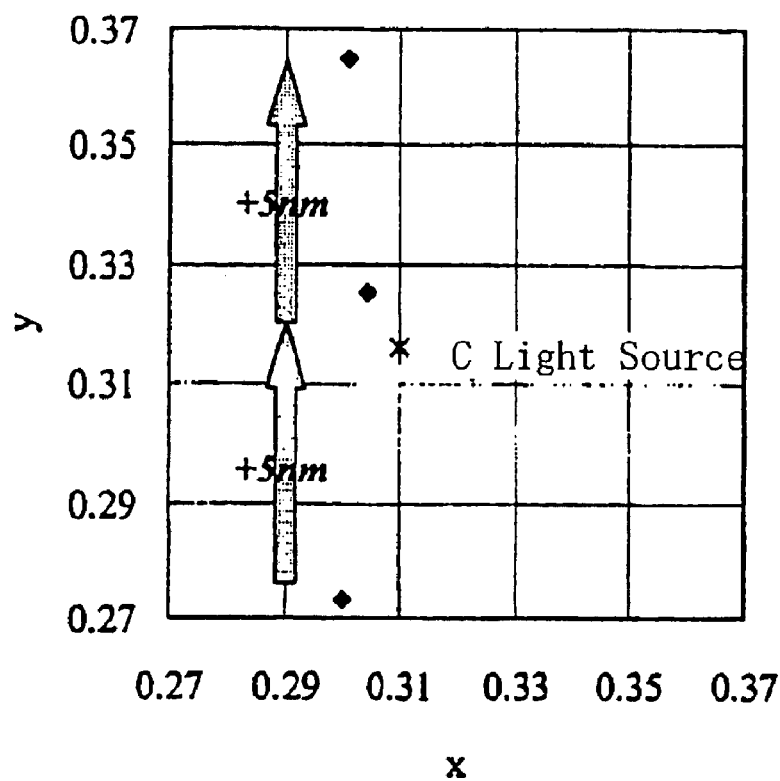
FIG. 6 is a explanatory diagram showing changes of the colors developed by the liquid crystal display element.

It was found that when a color filter was combined with a selective reflection wavelength on the long wavelength side, which realized red display having specific brightness and color purity, the achromatic level of available white display was limited to a certain range. The setting of the selective reflection wavelength on the short wavelength side is quite limited in order to realize good white display. As shown in FIG. 6, a great change in color purity was made only by slightly shifting the selection wavelength on the short side by about 5 to 10 nm with the selection wavelength on the long side fixed, for instance.

With respect to the display level for white, it was found that the provision of a color filter lowered the brightness and the color purity of white to some extent in comparison with a two-layered structure without a color filter stated below. There was found a tendency that the viewing angle dependency, based on which, e.g., a displayed color was observed as different colors in a direct front view and in a slant view, was slightly worse. The conditions stated above were selected so as to suppress the viewing angle dependency as small as possible.

Figure 7:
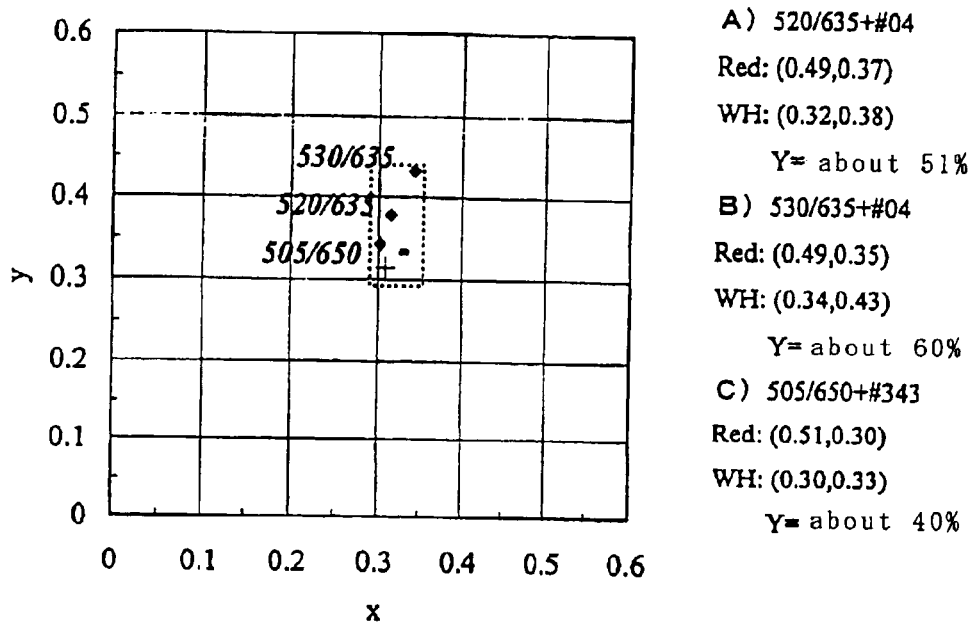
FIG. 7 is a explanatory diagram showing the state of developed colors in the examples of the present invention.

Referring now to FIG. 7, the red display means color purity, which is included in a region delimited by a boundary connecting four points of (0.47, 0.30), (0.60, 0.30), (0.47, 0.40) and (0.60, 0.40) on chromaticity coordinates or lies on the boundary.

The white display means color purity, which is included in a region delimited by connecting four points of (0.29, 0.29), (0.35, 0.29), (0.29, 0.44) and (0.35, 0.44) on the chromaticity coordinates or lies on the boundary. The coordinates are represented according to the C.I.E.1931 chromaticity coordinates.

It is preferable to utilize a color filter, the transmission property of which is set such that the transmissivity in the vicinity of (the set wavelength on the long wavelength side—70) nm is not higher than at least 85% of the transmissivity in the vicinity of (the set wavelength on the long wavelength side—30) nm. It is preferable that one of the panels and the color filter are bonded together through an adhesive layer, which has the transmission in a set wavelength range on the long wavelength side set at 60% or higher.

EXAMPLE 3

In this example, multi-color display of black, white and red was provided by a two-layered structure in combination with a color filter. This example is suited to an electronic shelf label for food racks or the like. Important information is displayed in red on special sale. Bright red display having high color purity, and black and white illumination were able to be both provided. A vermilion color was selected since warm colors are very popular for an electronic shelf label, which is particularly used at a food rack.

By setting the selective wavelength on the short wavelength side at a certain value, black and white display, which is extremely close to achromatic display, as well as bright red display having high color purity, has become possible. The structure of the liquid crystal panel was as follows: The selective reflection wavelength (the dominant wavelength) on the no-viewer side was set at 635 nm, and the selective reflection wavelength (the dominant wavelength) on the viewer side was set at 530 nm. As the color filter was utilized a color filter for 100 different colors, denoted by # 04 and having a spectral chart (sold under the product name of Roscolux). In the following explanation, the Y values are relative values to the white calibration plate, the coordinates are represented according to the C.I.E. chromaticity coordinates, and the filter numbers indicate model numbers of the filter.

The basic specification of the liquid crystal panel was as follows: The glass substrates had a thickness of 0.4 mm and had both surfaces formed with insulating layers. A double-sided polyimide film was provided as each alignment layer or was not provided. The cell gap was set at 4 μm (on the short wavelength side) and 4.5 μm (on the long wavelength side). As the liquid crystal materials were utilized the same one as in Example 4 in Japanese Patent Application No. 2000-140685. The liquid crystal panel on the no-viewer side had the rear side coated with a black paint for delustering.

The multi-color illumination was provided as follows: The states of both layers for specific displayed colors are indicated by P (the planar state) and F (the focal conic state). The driving method disclosed in Japanese Patent Application No. 2001-285979 was utilized to drive the display.

Color illumination was configured to be provided (1) by a combination of P (short) and P (long) for slightly greenish white, (2) by a combination of F (short) and F (long) for black, (3) by a combination of F (short) and P (long) for vermilion red, and (4) by a combination of P (short) and F (long) for bluish green. The values of the respective colors in the C.I.E. 1931 chromaticity coordinates were at (0.34, 0.43) for the white illumination, (0.49, 0.35) for the red illumination, (0.31, 0.29) for the black illumination, and (0.28, 0.46) for the green illumination.

A 250 W metal halide lamp was adopted as the light source and was located so that the incident angle was set at an angle of 20 deg to obtain reflection light from the liquid crystal panel at an angle of 0 deg. The ambient temperature was set at room temperature, the Y value was about 60%, and the contrast ratio was about 10.

It was revealed that a combination of a color filer denoted by #04 with 635 nm (long) and 520 nm (short), and a combination of a color filer denoted by #343 with 650 nm (long) and 505 nm (short) were available as another example (see FIG. 7). In that case, a double-sided polyimide film without being subjected to rubbing may be provided as an alignment layer or may be not provided. As the liquid crystal materials were utilized the same one as in Example 4 in Japanese Patent Application No. 2000-140685.

Figure 4:
FIG. 4 is a schematic view showing an example of information display provided by an electric shelf label with dot-matrix type of a display in an embodiment of the present invention.

By utilizing this example, multi-color display could be provided in the form shown in FIG. 4. The phrase "Today's" was displayed in black, the phrase "Special" was displayed in red, the phrase "Florida Grapefruit" was displayed in black on a blue background, the phrase "regular price ¥140 each" was displayed in black, the phrase "¥98" was displayed in red, and the entire background was displayed in slightly greenish white. (A color filter denoted by #04 for 530 nm/635 nm was utilized.) The entire background was set so as to provide nearly good white display when being seen from other directions than the front direction.

EXAMPLE 4

This example was configured to focus on good black and white display by a two-layered structure. It became possible to provide illumination in black, white and a chromatic color by use of a color filter in Example 3 stated earlier. However, the brightness and the color purity in white display were reduced to some extent, and the viewing angle dependency occurred in that example. The instant example was configured to provide black and white display in better fashion without a color filter being combined.

In the instant example, the liquid crystal panel on the viewer side is not necessarily set for a short wavelength since no color filter is used. It is possible to select the selective reflection wavelength of the liquid crystal panel on the viewer side according to application or taste since there is a tendency to bring illuminated colors closer to the color of the liquid crystal panel on the viewer side. The structure of the liquid crystal panels were as follows:

The selective reflection wavelength on the no-viewer side was set at 620 nm, and the selective reflection wavelength on the viewer side was set at 490 nm. Although the liquid crystal panels on the viewer and no-viewer sides may take the reverse combination in this example, it was revealed that the hue of white changed to a slightly cold hue. The other arrangement and the driving method of the liquid crystal panels were the same as those in Example 3.

The multi-color display was provided as follows: There were (1) a combination of P (short) and P (long) for white display, (2) a combination of F (short) and F (long) for black display, (3) a combination of F (short) and P (long) for yellow display, and (4) a combination of P (short) and F (long) for blue display. The multi-color display could be provided by selectively controlling display data and the phase states of the respective liquid crystal panels. The other conditions were the same as those in Example 3. The value of the brightness for white was about 45% in the Y value, and the contrast ratio was about 6. The values for the respective colors in the chromaticity coordinates were at (0.29, 0.31) for white, (0.24, 0.25) for black, (0.41, 0.36) for orange, and (0.18, 0.25) for blue.

The color filter may be provided as a single film as in the examples stated earlier or be provided by applying a material having an equivalent optical property to the liquid crystal panel surface. The application treatment is more preferable since it is suited to mass-production.

As explained, the present invention can properly change a displayed color for various sorts of information including information on item, information on part or information on material and extend the operational life of a battery by using, as the display for an electronic shelf label, a liquid crystal display element comprising a chiral nematic liquid crystal sandwiched between a substrate on a viewer side and a substrate on a rear side, and a certain light absorbing layer provided on the substrate on the rear side to; the liquid crystal developing a memory effect and being controllably brought into at least two different optical states of a planar state and a focal conic state, depending on an applied voltage; and the light absorbing layer providing a background color. As a result, it is possible to change the displayed color of various kinds of information including information on an item, information on parts and information on material, and to extend the operating life of the battery.

The entire disclosures of Japanese Patent Application No. 2001-290218 filed on Sep. 21, 2001 and Japanese Patent Application No. 2001-285979 filed on Sep. 19, 2001 including specifications, claims, drawings and summaries are incorporated herein by reference in their entireties.

What is claimed is:

1. A liquid crystal display element comprising
   at least two electrodes and
   two chiral nematic liquid crystal layers having two different selective reflection wavelengths and
   a color filter,
   wherein each chiral nematic liquid crystal layer is capable of developing at least two different stable optical states without applying voltage to said liquid crystal layer,
   at least three colors, comprising white and red, are obtainable in each pixel or each segment of said liquid crystal display element,
   the purity of said red color is adjusted by said color filter and
   said white color is produced only by mixing the two different selective reflection wavelengths.

2. The liquid crystal display element according to claim 1 wherein at least four colors are obtainable in each pixel or each segment of said liquid crystal display element.

3. The liquid crystal display element according to claim 1 wherein said colors further comprise a black color.

4. The electronic liquid crystal display element according to claim 1 wherein said colors further comprise a green color.

5. The liquid crystal display element according to claim 1 wherein said colors further comprise a blue color.

6. The liquid crystal display element according to claim 1 wherein the difference between the center wavelength of a selective reflective color in a planar state of one liquid crystal layer and the center wavelength of a selective reflective color in a planar state of the other liquid crystal layer is equal to or greater than 50 nm.

7. The liquid crystal display element according to claim 1 wherein one of said liquid crystal layers has a center wavelength in a planar state that is less than or equal to 550 nm.

8. The liquid crystal display element according to claim 1 further comprising a layer, sandwiched between two chiral nematic liquid crystal layers, capable of absorbing a certain wavelength.

9. The liquid crystal display element according to claim 1 wherein at least two colors display the price information in the same background color.

10. The liquid crystal display element according to claim 1 wherein a segment type electrode is arranged to display an information on price and/or incidental matter.

11. The liquid crystal display element according to claim 1 wherein a segment type electrode is arranged to display an information on price and/or incidental matter and another segment type electrode is arranged to display a background color.

12. The liquid crystal display element according to claim 1 wherein dot-matrix type electrodes are arranged to display an information on price and/or incidental matter.

13. The liquid crystal display element according to claim 1 wherein both a segment type electrode and dot-matrix type electrodes are arranged to display an information on price and/or incidental matter.

14. The liquid crystal display element according to claim 1 wherein said white color is developed by mixing two selective reflective colors produced by the planar states of the two chiral nematic liquid crystal layers.

15. The liquid crystal display element according to claim 1 wherein a signal comprising information on price and/or incidental matter to be displayed is inputted to the liquid crystal display element by a wireless communication device.

16. The liquid crystal display element according to claim 15 wherein said wireless communication device comprises an IR communication technique.

17. The liquid crystal display element according to claim 15 wherein said wireless communication device comprises a radio-frequency communication technique.

18. The liquid crystal display element according to claim 1 wherein the display element further comprises a battery for a power supply to drive said chiral nematic liquid crystal layer.

* * * * *